United States Patent [19]
Mabuchi

[11] Patent Number: 5,479,056
[45] Date of Patent: Dec. 26, 1995

[54] POWER SOURCE DEVICE

[75] Inventor: Toshiaki Mabuchi, Tokyo, Japan

[73] Assignee: Canon Kabushiki Kaisha, Tokyo, Japan

[21] Appl. No.: 272,873

[22] Filed: Jul. 11, 1994

Related U.S. Application Data

[63] Continuation of Ser. No. 957,448, Oct. 6, 1992, abandoned, which is a continuation of Ser. No. 835,104, Feb. 12, 1992, abandoned, which is a continuation of Ser. No. 439,850, Nov. 20, 1989, abandoned.

[30] Foreign Application Priority Data

Nov. 30, 1988 [JP] Japan .................................. 63-300844

[51] Int. Cl.$^6$ ...................................................... H04Q 3/00
[52] U.S. Cl .......................... 307/38; 307/97; 340/825.16; 354/286; 354/195.1
[58] Field of Search .................................. 307/31, 35, 38, 307/39, 40, 96, 296.4, 97, 116, 150, 29, 115; 361/1, 64, 66, 68, 69, 71, 75; 340/502, 568, 635, 687, 825.16; 324/500, 511; 354/286, 289.12, 400, 195; 360/33.1, 85, 93; 358/335, 906; 370/16, 17; 327/538

[56] References Cited

U.S. PATENT DOCUMENTS

| | | | |
|---|---|---|---|
| 3,936,700 | 2/1976 | Reiter | 361/75 |
| 4,430,682 | 2/1984 | Babsch | 361/31 |
| 4,737,812 | 4/1988 | Hasegawa et al. | 354/400 |
| 4,782,355 | 11/1988 | Sakai et al. | 354/400 |
| 4,915,639 | 4/1990 | Cohn et al. | 439/188 |
| 4,924,249 | 5/1990 | Aihara et al. | 354/286 |
| 4,963,763 | 10/1990 | Minagawa et al. | 307/35 |
| 5,012,120 | 4/1991 | Minagawa et al. | 307/35 |

Primary Examiner—William M. Shoop, Jr.
Assistant Examiner—Richard T. Elms
Attorney, Agent, or Firm—Robin, Blecker, Daley & Driscoll

[57] ABSTRACT

A power source device to and from which an interchangeable first device can be attached and detached and operating in such a manner that when the first device is attached and when the first device is judged to be normally operating, electric power is supplied at all times to the first device, while when the first device is not attached, or when, though the first device is attached, the first device is judged not to be normally operating, electric power is supplied in a predetermined periodicity to the first device.

16 Claims, 4 Drawing Sheets

POWER SOURCE DEVICE

This is a continuation of prior application Ser. No. 07/957,448, filed Oct. 6, 1992, (now abandoned) which is a continuation of Ser. No. 07/835,104, filed Feb. 12, 1992 (abandoned) which is a continuation of Ser. No. 07/439,850 filed Nov. 20, 1989 (abandoned).

BACKGROUND OF THE INVENTION

1. Field of the Invention

This invention relates to power source devices and, more particularly, to a power source device for supplying electric power to another device which is attachable to and detachable from the power source device.

2. Description of the Related Art

Conventionally, in the power source device to and from which a first device is attachable and detachable, as the means for controlling the supply of electric power to this first device, a system is known which, regardless of whether or not the first device is attached, supplies electric power at all times. Another system is known which operates in such a manner that, whether or not the first device is attached is mechanically detected by a switch or the like. Only when this device is being attached is the electric power supplied to the first device, while when the first device is not attached, the supply of the electric power to this device is stopped.

However, in such conventional examples as described above, with the former system that does the aforesaid supply of electric power regardless of whether or not the first device is attached, because the electric power is always supplied to the electric power supply terminals for the first device even when the first device is not attached, there is a possibility of occurrence of a short-circuiting if an electrically conductive object accidentally contacts across these terminals. This short-circuiting will be apt to cause damage to the power source device, or to destroy the safety device, such as fuse, of the power source device. In the case of the latter system that mechanically detects the presence or absence of the first device, concerning the above-described problem, a solution can be found that upon judgment of the fact that the first device is not attached, the electric power supply is stopped. Yet it also is accompanied with an alternative problem that the cost increases by the amount of the aforesaid detecting means.

With the first device in the normal attaching state, if it happens that the first device does not operate normally, then problems arise, particularly in a type of the first device which has elements that consume a relatively large amount of current at the start of movement thereof, for example, an electric motor, a plunger or the like. Also, if the first device has a microcomputer and other logic circuits as its control system and they malfunction such that normal control is not present, possibilities exist for damage to the first device, since as electric power is continually supplied thereto. The power source may also be consumed or its fuse may be destroyed.

SUMMARY OF THE INVENTION

With the above-described problems of the conventional examples in mind, the present invention has been made, and its object is to obtain a power source device of this kind which enables the possibility of occurrence of a malfunction, damage or breakage to be lowered even though the unnecessary electric power supply takes place when the before-described first device is not attached, or even though when attached, the operation of the first device is not normal.

To achieve this object, according to the invention, in an embodiment thereof, a power source device is so constructed that, whether or not the first device is attached and whether or not the first device is normally operating are examined. When it is determined that the first device is attached and that the first device is normally operating, supply of the electric power to the first device continues, while, when it is determined that the first device is not attached, or that though the first device is attached but the first device does not normally operate, the supply of electric power to the first device is provided in a predetermined periodicity.

The use of such a feature of the invention produces an advantage that the wasteful electric power supply and the probability of malfunction at the time of an abnormal event can be reduced since the electric power supply changes from the continuous mode to the periodic mode when the first device is not attached, or when the operation of the first device is determined to be not normal.

Other objects of the invention and its features will become apparent from the following description and drawings.

DETAILED DESCRIPTION OF THE PREFERRED EMBODIMENTS

Figure 1:
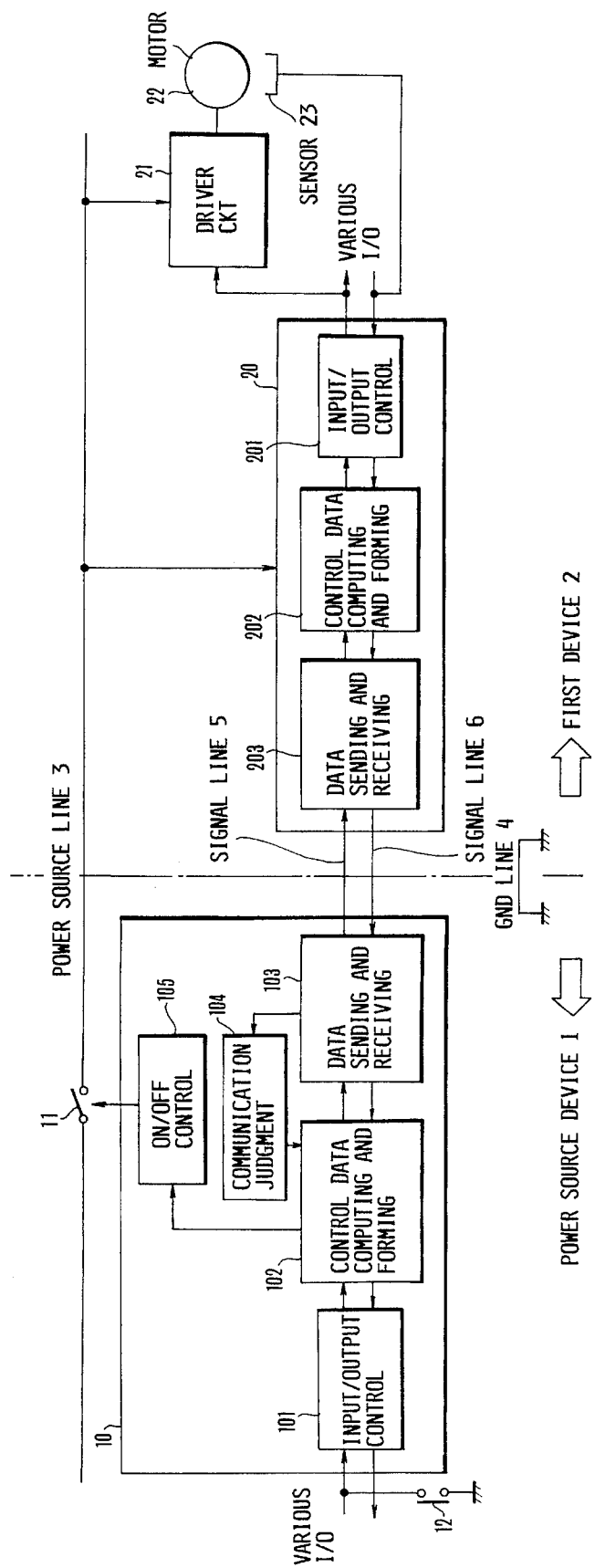
FIG. 1 is a block diagram of the construction of an embodiment according to the invention.

In FIG. 1, there is shown one embodiment of a power source device according to the invention wherein reference numeral 1 denotes the power source device, and reference numeral 2 denotes what is called the "first device" in the invention. The power source device 1 and the first device 2 are arranged to be attachable to, and detachable from, each other in interchanging fashion with their boundary indicated by a central vertical dot and dash line of the drawing. When attached, at least a power source line 3, a GND line 4 and signal lines 5/6 for sending/receiving of data, are established. The arrows in these signal lines 5 and 6 represent the directions in which the respective signals go. Incidentally, each of the signal lines 5 and 6 takes either a parallel form or the serial form, depending on the necessity of control information between the power source device 1 and the first device 2. But in the following explanation, for the purpose of simplicity, the serial communication is assumed.

A logic circuit block 10 such as a microcomputer governs the control of the power source device 1 side, comprising an input/output control block 101, a block 102 receptive of the input data, the information from the first device 20 etc., for forming by computation an output and data which is to be applied to the first device 2, a data sending and receiving block 103 for controlling the giving and receiving of various kinds of data, a communication judging block 104 for checking the content of the communication with the first device 2 to judge whether or not the communication has been done normally, a control block 105 responsive to its judgment for turning on/off the electric power supply to the first device 2, etc. Also, there is a switch circuit 11 for turning on/off the actual power source line 3 by the electric power control data from the on/off control block 105. A button switch 12 is used to operate an electric motor 22 to be described later.

Meanwhile, a logic circuit block 20 such as a microcomputer for governing the control of the first device 2 side comprises an input/output control block 201 for controlling various kinds of inputs and outputs, a block 202 receptive of the input data and the information from the power source device 1 for forming by computation an output and data which is to be applied to the power source device 1, a data sending and receiving block 203 for controlling the giving and receiving of various kinds of data with the power source device 1, etc. It is assumed that the electric power is supplied to the logic circuit block 20 through the power source line 3. It is also assumed that among the inputs and outputs there are included the control data to a driver circuit 21 for driving the motor 22, the information from a sensor 23 mounted on the motor 22, etc.

Next, the operation of such an arrangement as described above is described. In a case where the power source device 1 and the first device 2 are normally connected to each other, and operate normally as a system, the switch 11 is turned on, and power is supplied through the power source line 3 to the first device 2. At this time, the logic circuit block 10 of the electric power source device 1 and the logic circuit block 20 of the first device 2 give and receive data to and from each other in relatively short periods (for example, by every 10 ms).

For example, in FIG. 1, if the operator desires to operate the motor 22 of the first device 2 by using the operating switch 12 of the power source device 1, a control is made as follows: when the switch 12 of the power source device 1 is turned on, the input/output control block 101 recognizes it and sends it to the control data computing and forming block 102. The control data computing and forming block 102, according to the previously determined algorithm, generates a control code to the first device 2, etc. The data sending and receiving block 103 converts the control code into a previously determined communication format (for example, serial form), and sends it to the first device 2 through the signal line 5. Its data is restored to the control code in the data sending and receiving block 203 of the first device 2, which is then transmitted to the control data computing and forming block 202. In the control data computing and forming block 202, according to the previously determined algorithm, control information to the driver 21 is made as the output information. Based on that control information, the driver 21 operates the motor 22. As the motor 22 moves, the sensor 23 also changes its output. This output information is taken as an input in the input/output control block 201 and therefrom transmitted to the control data computing and forming block 202. The control data computing and forming block 202, according to the previously determined algorithm, generates a sensor information code, etc., to the power source device 1. The data sending and receiving block 203 converts this information code into the previously determined communication format (for example, serial form) and sends it through the signal line 6 to the power source device 1. Its data is restored to the information code in the data sending and receiving block 103 of the power source device 1 and therefrom transmitted to the control data computing and forming block 102. The control data computing and forming block 102, according to the previously determined algorithm, varies the speed control data and does display the data by varying its outputs.

Here, in order to check the communication line, a certain rule is previously determined on the communication data to be sent from the power source device 1 to the first device 2 and the communication data to be sent from the first device 2 to the power source device 1. (For example, means is provided for using a portion of the communication data sent from the power source device 1 to the first device 2 is as the data to be sent from the first device 2 to the power source device 1). The communication judging block 104 of the power source device 1 performs the checking of the communication line by judging whether or not this rule is adopted and sends information representing whether or not to permit communication to the control data computing and forming block 102.

Next, in a case where the power source device 1 and the first device 2 get detached from each other from the attached state, the system operates as follows: from the power source device 1, as has been described before, communication is recycled by a relatively short interval. Since, at this time, the first device 2 is not connected, information does not come to the signal line 6. Because of this, the communication judging block 104 sending information representing that communication is rejected to the control data computing and forming block 102. At this time, the power source line 3 still continues supplying electric power. If it is left to remain in such a state, the accidental short-circuiting between the power source line 3 and the GND line 4 will be apt to cause consumption of or damage to the power source device 1.

Figure 2:
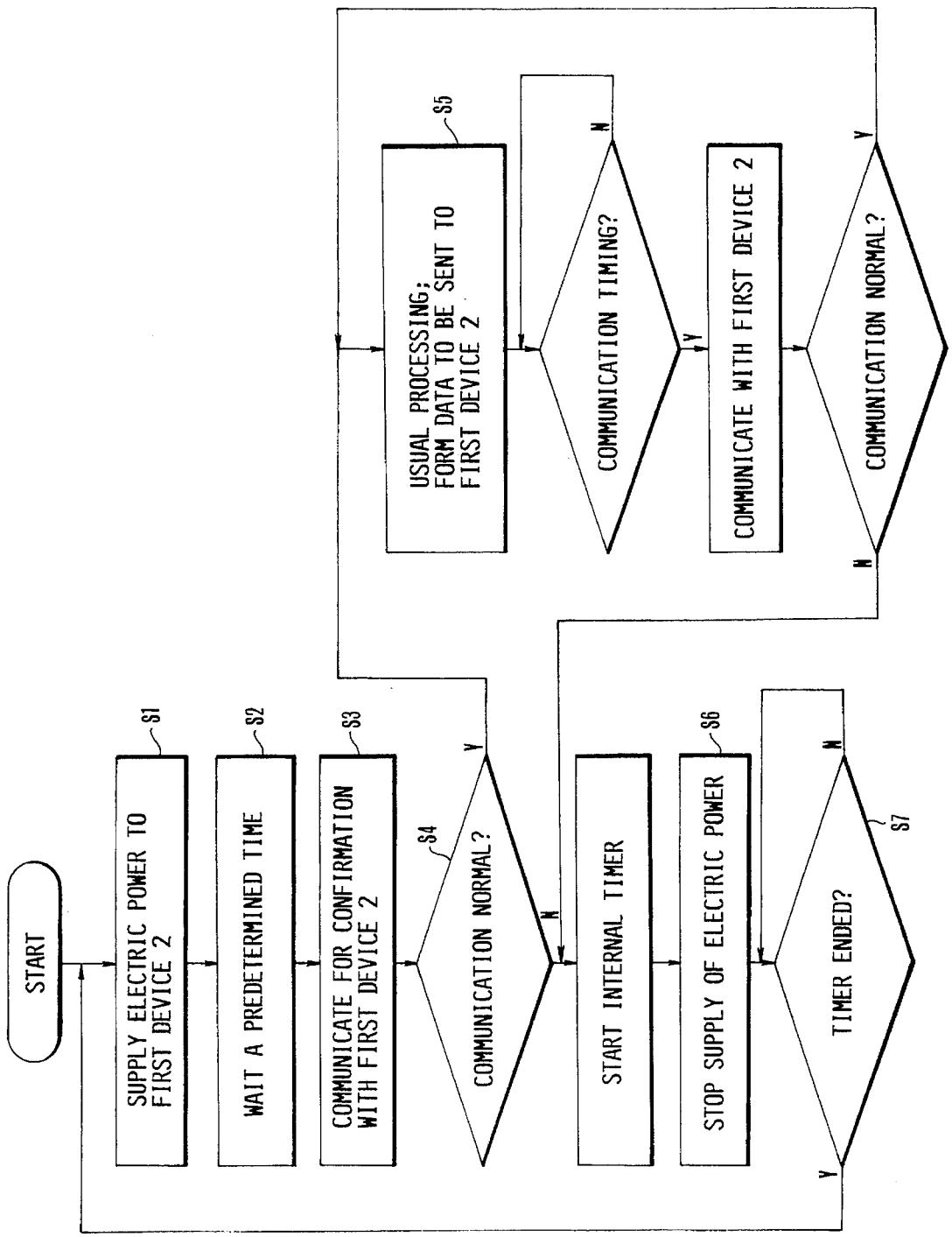
FIG. 2 is a flowchart for the sequence of control operations of the power source side of FIG. 1.

Therefore, the control data computing and forming block 102 then sends an "off" command to the on/off control block 105. Based on this command, the on/off control block 105 turns off the switch 11, stopping the supply of electric power to the power source line 3. Yet, if this would hold, it would become impossible to supply electric power again when the first device 2 is attached again. On this account, as is understandable from the flowchart of FIG. 2, showing the sequence of control operations of the logic circuit block 10 of the power source device 1 side, the control data computing and forming block 102 is provided with internal time counting means such as a timer so that it sends an "on" command to the on/off control block 105 in a relatively long periodicity (for example, about 1 second). Based on this command, the on/off control block 105 turns on the switch 11. Thus electric power is supplied again to the power source line 3 (step S1). The control data computing and forming block 102, after a certain time, measured from the moment it output the "on" command to the on/off control block 105 (in the case where the first device 2 is normally attached, this time is from the termination of initialization of the logic circuit block 20 of the first device 2 to a moment at which the communication data from the power source device 1 becomes possible to receive) (step S2), performs communication for confirmation to the signal line 5 through the data sending and receiving block 103 (step S3).

If, at this time, the first device 2 is normally attached, the data from the first device 2 side is sent to the signal line 6. The communication judging block 104 then judges it as normal (step S4, Y). The control data computing and forming block 102 starts again to carry out the usual processing (step S5). Also, meanwhile, if at this time the first device 2 is not normally attached, no normal data is sent to the signal line 6. Therefore, the communication judging block 104 judges it as abnormal (step S4, N). The control data computing and forming block 102 then outputs the "off" command again to the on/off control block 105. Responsive to this, the on/off control block 105 turns off the switch 11 to stop supplying of the electric power again (step S6). The control data computing and forming block 102 actuates the internal timer again. After a specified time, this procedure is repeated (step S7).

Even in a case where although the first device 2 is normally attached, if the logic circuit block 20 of the first device 2 is not normally operating, (for example, due to the breakage, a reckless run of the microcomputer, latch up, etc.), the communication data to be outputted to the signal line 6 becomes abnormal, and the same sequence as that described above takes place. Hence, the standing supply of electric power is stopped. Thus, the system is prevented from being destroyed.

Figure 3:
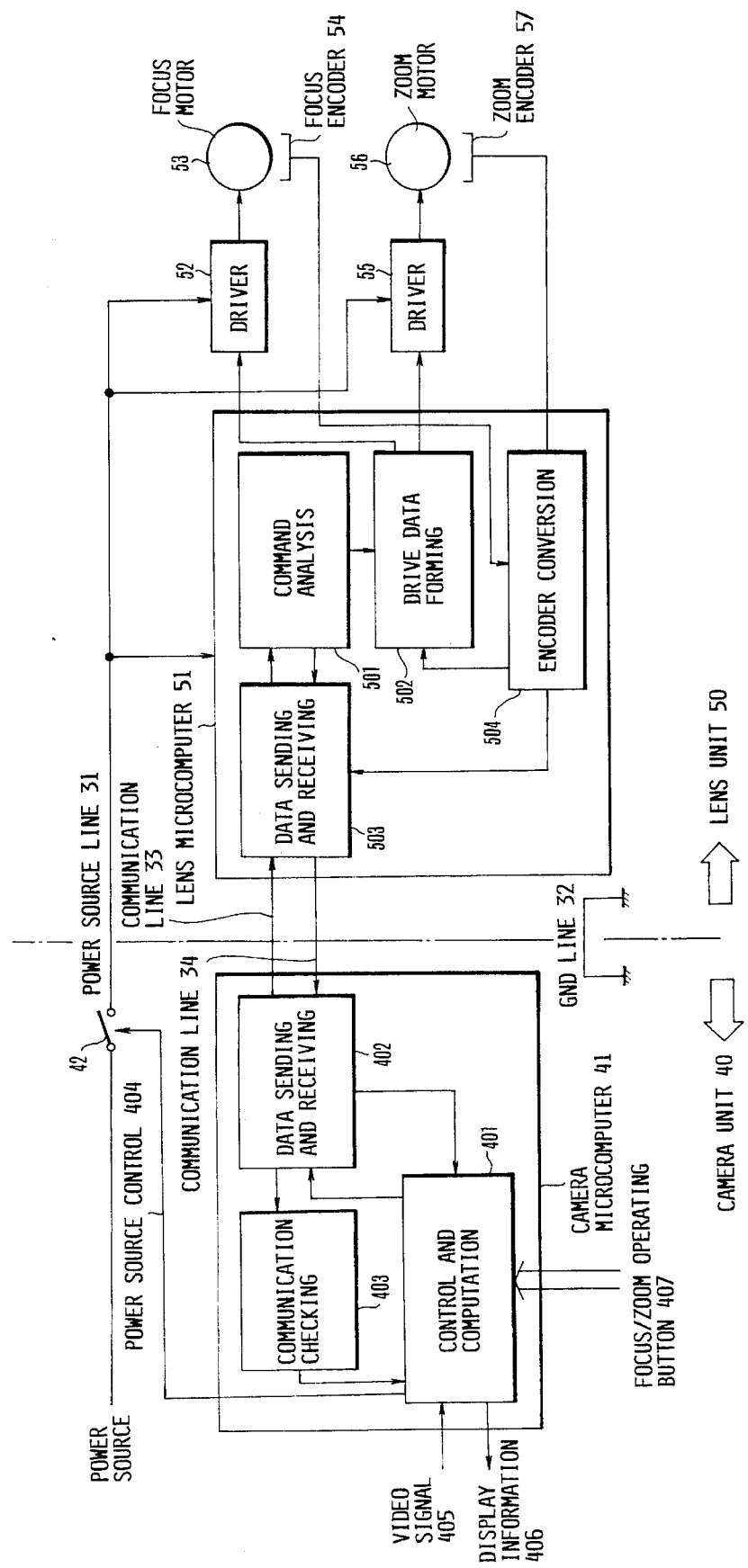
FIG. 3 illustrates an example of application of the invention to an interchangeable-lens type video camera.

Next, as a specific embodiment, an example of the application of the principle of the invention to the interchangeable-lens type video camera (recorder) is shown in the block diagram of FIG. 3. In FIG. 3, a camera unit 40, having the power source device for an interchangeable lens system and a lens unit 50 of the interchangeable lens system as the first device, are so constructed that when both units are in the attached state with each other, their electric power source lines 31, GND lines 32 and communication lines 33 and 34 are brought into electrical connection with each other. A camera microcomputer 41 governs the control of the camera unit 40 and has its internal functions, in broad outline, grouped to a control computing unit 401 which governs the control of focusing, zooming, etc., in accordance with the data from the lens unit 50, a data sending and receiving unit 402 for sending and receiving data and a communication checking unit 403 for checking whether the communication is normal or abnormal. The microcomputer 41 is provided with a power source control line 404 for turning on/off the electric power supply to the lens unit 50, and input and output terminals for video signals 405 as the reference of generating the communication period at the normal time, display information 406, and the outputs of a plurality of operating buttons 407 for focusing, zooming, etc.

Meanwhile, a lens microcomputer 51 governs the control of the lens unit 50 and its internal functions, in broad outline, grouped to a data sending and receiving unit 503 for performing communication with the camera unit 40, a command analysis unit 501 for analyzing the data from the camera unit 40, a drive data forming unit 502 for forming drive control data to be sent to drivers 52 and 55 and an encoder conversion unit 504 for converting information of encoders 54 and 57 associated with respective motors 53 and 56 to form data which are to be sent back to the camera unit 40 and also to perform correction on the drive data. The microcomputer 51 is provided with input and output terminals for the control signals to the drivers 52 and 55 for the respective motors and the information from the encoders 54 and 57.

In the normally attached state, a switch 42 turns on to supply electric power to the lens unit 50 through the power source line 31. With this state, when the focus/zoom operating button 407 is operated, the camera microcomputer 41 carries out computation based on the information of the encoder 54 or 57 from the lens unit 50 to form data about how to control the motor 53 or 56 and sends the result to the lens unit 50 through the communication line 33. Upon receipt of the data, the lens microcomputer 51 carries out command analysis to identify what sort of command is given and outputs a control command to the necessary one of the drivers 52 and 55. As a result, the driver 52 or 55 operates the motor 53 or 56. As the motor 53 or 56 rotates, the encoder 54 or 57 cooperating with it changes its information, which is converted into data by the lens microcomputer 51.

This data is transmitted to the camera microcomputer 41 through the communication line 34. At this time, the communication line 34 transmits a portion of the command which was sent through the communication line 33 for use to the checking purpose simultaneously to the camera microcomputer 41.

The camera microcomputer 41 first checks the data sent from the lens microcomputer 51 through the communication line 34 by the communication checking unit 403. In a case where the communication is regarded as normal, the fact that the communication is normal is transmitted to the control computing unit 401. In the control computing unit 401, computation is carried out again based on the data sent from the lens microcomputer 51 and new control data to be sent to the lens microcomputer 51 are formed. The communication is carried out at the video signal rate, and the data is always given and received between the camera microcomputer 41 and the lens microcomputer 51.

In this state, if the connection between the camera and lens units 40 and 50 has been broken, or if a faulty operation of the lens microcomputer 51 has occurred, the data which has to be sent through the communication line 34 no longer exits, or the content becomes abnormal. As the communication checking unit 403 of the camera microcomputer 41 always monitors this communication, when it detects an abnormal event, it transmits this information to the control computing unit 401. Responsive to this, the control computing unit 401 works through the power source control line 404 to turn off the power source switch 42. Thus, the electric power supply from the power source line 31 is stopped. After that, the control computing unit 401 works with the internal timer (not shown) and, after a predetermined time has elapsed, turns on the power source switch 42 again through the power source control line 404. Also, after a predetermined time expected to be required for the initialized state of the lens microcomputer 51, data for requesting the communication confirmation are transmitted through the communication line 33 to the lens microcomputer 51. If, at this time, the lens microcomputer 51 is normal, the normal data returns to the camera microcomputer 41 through the communication line 34 and the camera microcomputer 41 starts to operate as usual. If the lens microcomputer 51 is abnormal, or if the lens unit 50 is not connected, as it implies that the data becomes abnormal, the camera microcomputer 41 actuates the aforesaid internal timer again. Such a procedure is repeated.

Figure 4:
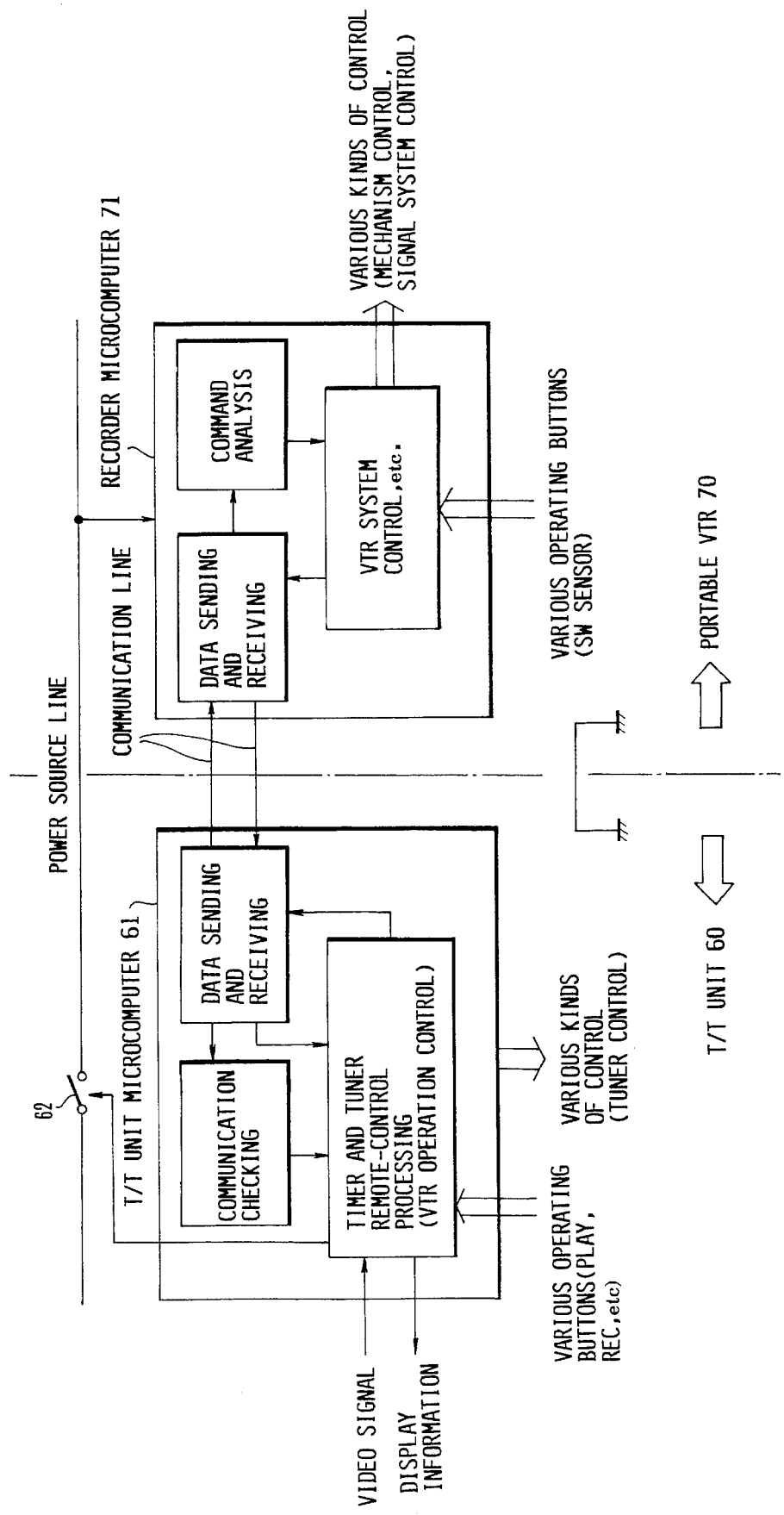
FIG. 4 illustrates another example of application of the invention to a portable video deck.

FIG. 4 also shows a specific embodiment and is a block diagram of construction when the invention is applied to a portable type video deck. In the figure, a timer-tuner (T/T) unit 60 is on the power source side. A T/T unit microcomputer 61 governs the control of the T/T unit 60. A portable VTR 70 is taken as the first device. A recorder microcomputer 71 governs the control of the portable VTR 70.

Though, because of its principle being the same as that of the foregoing embodiment, a detailed explanation is omitted, features are made that the T/T unit microcomputer 61 checks the communication data from the recorder microcomputer 71 so that if it is normal, electric power is always supplied and that, when not in connection, or a faulty operation of the recorder microcomputer 71 occurs, electric power is supplied in a predetermined periodicity, and confirmation of the connection is carried out by checking the communication content.

It is apparent that the principle of the invention is applicable not only to the specific example as described above, but also to all systems which are able to attach and detach and in which electric power is supplied from one side and it is on this side of supplying the electric power that it is possible to check the content of the data communication.

As has been described above, according to the invention, arrangement is made so that the supply of electric power is carried out in the standard way only when the communication with the first device is normally being carried out, and when the communication has come into an abnormal state, the electric power supply is carried out in a predetermined periodicity. Therefore, when not attached, such a deficit as the unnecessarily long supply of electric power does not arise, thereby making it possible to reduce the probability to the occurrence of a breakage or malfunction. Another advantage is that the mechanical means for detecting the attachment becomes unnecessary, thereby making it possible to reduce the production cost.

Also, even if, as the microcomputer, etc., of the side to be attached latches up or does other faulty operations, current is always supplied to, for example, the motor, etc., it is on the electric power source side that the abnormality becomes possible to detect. Therefore, the unnecessary overload on the driver or the motor can be lowered.

Also, in a case where the microcomputer, etc., of the attached first device side has latched up by electrostatic noise, etc., electric power is supplied again. From this, the reset effect too can be expected.

Furthermore, since the control algorithm of the electric power source side can be realized by a common method for all of the above-described cases, there is an additional advantage in that the aforesaid functions are realized without having to increase the software and hardware.

What is claimed is:

1. A power supply system having a power source and an outer device which is detachably attached to said power source, comprising:
   (a) judging means for judging whether data communication between said power source and said outer device is normal or not; and
   (b) control means for intermittently supplying power from said power source to said device and for intermittently carrying out data communication by said judging means when the data communication is judged not to be normal until the data communication is judged to be normal.

2. A system according to claim 1, wherein said power source includes a camera unit, and wherein said outer device includes a lens unit.

3. A system according to claim 1, wherein said power source includes a timer-tuner unit, and wherein said outer device includes a video tape recorder.

4. A system according to claim 1, wherein said power source and said outer device are connected with each other through a connector for forming a power source line and a duplex communication line.

5. A system according to claim 4, wherein said data communication is carried out at a period in which a normal communication period is generated on the basis of a video signal.

6. A system according to claim 4, wherein the giving and receiving of data by said duplex communication line includes a portion of data sent from said power source to said outer device.

7. A system according to claim 4, wherein the data communication by said duplex communication line is carried out at a video signal rate.

8. A system according to claim 1, wherein said outer device includes a motor.

9. A power supply system having a power source and an outer device which is detachably attached to said power source, comprising:
   (a) judging means for intermittently carrying out data communication to judge whether data communication between said power source and said outer device is normal or not; and
   (b) control means for intermittently supplying power from said power source to said outer device when the data communication is judged not to be normal and for continually supplying power from said power source to said outer device when the data communication is judged to be normal.

10. A power supply according to claim 9, wherein said power source includes a camera unit, and wherein said outer device includes a lens unit.

11. A power supply system according to claim 9, wherein said power source includes a timer-tuner unit, and wherein said outer device includes a video tape recorder.

12. A power supply system according to claim 9, wherein said power source and said outer device are connected with each other through a connector for forming a power source line and a duplex communication line.

13. A power supply system according to claim 12, wherein said data communication is carried out at a period in which a normal communication period is generated on the basis of a video signal.

14. A power supply system according to claim 12, wherein the giving and receiving of data by said duplex communication line includes a portion of data sent from said power source to said outer device.

15. A power supply system according to claim 12, wherein the communication by said duplex communication line is carried out at a video signal rate.

16. A power supply system according to claim 9, wherein said outer device includes a motor.

* * * * *